US009622091B2

(12) United States Patent
Garg et al.

(10) Patent No.: US 9,622,091 B2
(45) Date of Patent: *Apr. 11, 2017

(54) ONLINE AND DISTRIBUTED OPTIMIZATION FRAMEWORK FOR WIRELESS ANALYTICS

(75) Inventors: Vikas Kumar Garg, Bangalore (IN); Ankur Narang, New Delhi (IN); Shivkumar Kalyanaraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 13/548,533

(22) Filed: Jul. 13, 2012

(65) Prior Publication Data
US 2013/0172043 A1 Jul. 4, 2013

Related U.S. Application Data

(63) Continuation of application No. 13/353,776, filed on Jan. 19, 2012.

(30) Foreign Application Priority Data

Dec. 31, 2011 (IN) .......................... 3893/DEL/2011

(51) Int. Cl.
*H04W 24/02* (2009.01)
*H04W 28/16* (2009.01)

(52) U.S. Cl.
CPC ............ *H04W 24/02* (2013.01); *H04W 28/16* (2013.01)

(58) Field of Classification Search
CPC .................................................. H04W 24/02
See application file for complete search history.

(56) References Cited

U.S. PATENT DOCUMENTS 7,975,025 B1 7/2011 Szabo et al.
8,001,217 B1 * 8/2011 Pan .......................... H04W 4/08 709/219

(Continued)

FOREIGN PATENT DOCUMENTS

CN 101449527 A 6/2009
CN 101467148 A 6/2009
WO 2012078643 A2 6/2012

OTHER PUBLICATIONS

"MobHinter: Epidemic Collaborative Filtering and Self-Organization in Mobile Ad-Hoc networks" by Schifanella et al., The ACM Conference Series on Recommender Systems, 2008.*

(Continued)

*Primary Examiner* — Vladimir Magloire
*Assistant Examiner* — David Orange
(74) *Attorney, Agent, or Firm* — Brian J. Colandreo, Esq.; Jeffrey T. Placker, Esq.; Holland & Knight LLP

(57) ABSTRACT

A method, computer program product, and computer system directed to an online and distributed optimization framework for wireless analytics. A radio network controller determines a ranking for each of a plurality of received objects using a plurality of similarity graphs. The radio network controller extracts a common structure by collaborative filtering data associated with a plurality of user devices and the plurality of received objects. The common structure is analyzed to infer usage patterns within a time slot. The radio network controller stores a subset of the ranked objects of the plurality of received objects in response to the analysis.

7 Claims, 3 Drawing Sheets

(56) References Cited

U.S. PATENT DOCUMENTS

| | | | |
|---|---|---|---|
| 8,170,971 B1* | 5/2012 | Wilson et al. | 706/46 |
| 8,601,003 B2* | 12/2013 | Gates et al. | 707/749 |
| 2003/0100289 A1 | 5/2003 | Call et al. | 455/403 |
| 2006/0233342 A1* | 10/2006 | Thione | H04L 12/66 379/221.09 |
| 2007/0087756 A1* | 4/2007 | Hoffberg | 455/450 |
| 2008/0097941 A1* | 4/2008 | Agarwal | G06N 99/005 706/12 |
| 2008/0183653 A1* | 7/2008 | Byrnes et al. | 706/50 |
| 2008/0275902 A1* | 11/2008 | Burges et al. | 707/102 |
| 2009/0003279 A1* | 1/2009 | Abusch-Magder et al. | 370/331 |
| 2009/0006290 A1* | 1/2009 | Gunawardana et al. | 706/14 |
| 2009/0287750 A1* | 11/2009 | Banavar | H04L 29/06 |
| 2010/0008290 A1 | 1/2010 | Fischer | |
| 2010/0034089 A1 | 2/2010 | Kovvali et al. | |
| 2010/0076958 A1* | 3/2010 | Gates et al. | 707/722 |
| 2010/0105315 A1* | 4/2010 | Albrett | 455/3.04 |
| 2010/0161831 A1* | 6/2010 | Haas et al. | 709/235 |
| 2010/0205292 A1 | 8/2010 | Diaz | |
| 2010/0311435 A1* | 12/2010 | Mueck et al. | 455/453 |
| 2012/0142319 A1 | 6/2012 | Joshi et al. | |
| 2012/0157136 A1* | 6/2012 | Pitt et al. | 455/500 |
| 2012/0257560 A1* | 10/2012 | Srinivasan | H04W 4/18 370/312 |

OTHER PUBLICATIONS

Combined Search Report and Examination Report received in Application No. GB1222158.6, Search Report Dated May 21, 2013, pp. 1-4.

Lungaro, et al., "ContextShift: A Model for Efficient delivery of Content in Mobile Networks", IEEE Communications Society, 2010, WCNC 2010 proceedings. pp. 1-6.

P. Backx et al., "Optimizing Content Distribution through Adaptive Distributed Caching", Computer Communications, vol. 28, No. 6, pp. 640-653, 2005.

S. Ioannidis, et al., "Distributed Caching Over Heterogeneous Mobile Networks", Sigmetrics, 2010, Jun. 14-18, 2010, pp. 1-12.

Z. Lu et al., "A Spatio-Temporal Approach to Collaborative Filtering", RecSys '09, Oct. 23-25, 2009, pp. 1-8.

A. Banerjee et al., "A Generalized Maximum Entropy Approach to Bregman Co-Clustering and Matrxc Approximations", JMLR, Vo. 8, pp. 1919-1986, 2007.

* cited by examiner

ONLINE AND DISTRIBUTED OPTIMIZATION FRAMEWORK FOR WIRELESS ANALYTICS

RELATED APPLICATIONS

The subject application is a continuation application of U.S. patent application with Ser. No. 13/353,776, the entire content of which is herein incorporated by reference, which claims priority to Indian Patent Application No. 3893/DEL/2011, entitled "Online and Distributed Optimization Framework for Wireless Analytics", filed on Dec. 31, 2011, incorporated herein by reference, in its entirety.

TECHNICAL FIELD

This disclosure relates to cellular networks, and more particularly, to online and distributed optimization frameworks for wireless analytics.

BACKGROUND

Cellular networks may span large geographical regions with multiple base stations scattered providing coverage for the networks. Substantial amounts of data may be transferred from one node to another, where the nodes may include mobile and cellular devices and computing systems that may provide resources, such as web pages, audio files, video files, and other types of data. Due to the ubiquitous nature of mobile and cellular devices, 3G and 4G cellular networks may suffer from increasing demands on the limited spectrum bandwidth. For example, high levels of video downloads and increased generalized Value Added Services (VAS) may negatively affect the cellular network. The resulting network congestions and possible bandwidth inadequacy may contribute to a poor user experience due to the unavailability of requested resources. Telecommunication companies may seek to optimize the usage of the limited available bandwidth to maximize revenue and enhance the experience of the user.

BRIEF SUMMARY

In one implementation, a method for an online and distributed optimization framework for wireless analytics, performed by one or more computing devices, includes a radio network controller determining a ranking for each of a plurality of received objects using a plurality of similarity graphs. The radio network controller extracts a common structure by collaborative filtering data associated with a plurality of user devices and the plurality of received objects. The common structure is analyzed to infer usage patterns within a time slot. A subset of the ranked objects of the plurality of received objects is stored in response to the analysis.

One or more of the following features may be included. The plurality of similarity graphs may include an object-object similarity graph, a base station-base station similarity graph, and a user-user similarity graph. The ranking for each of the plurality of received objects may be based upon, at least in part, a demand at each of a plurality of base stations, a weighting factor for premium and non-premium demands, and a bandwidth associated with each object of the plurality of received objects. Storing a subset of ranked objects of the plurality of received objects may include cooperatively storing the subset of higher ranked objects across a plurality of base stations. The method may include generating demand predictions across time slots for a plurality of base stations. The method may include identifying which of the plurality of user devices and the plurality of received objects occur together. The method may include generating an online update of the ranking for each of the plurality of received objects and the plurality of users. In some embodiments, the collaborative filtering may be based upon, at least in part, co-clustering.

In another implementation, a computer program product resides on a computer readable medium that has a plurality of instructions stored on it. When executed by a processor, the instructions cause the processor to perform operations including determining a ranking for each of a plurality of received objects using a plurality of similarity graphs; extracting a common structure by collaborative filtering data associated with a plurality of user devices and the plurality of received objects; analyzing the common structure to infer usage patterns within a time slot; and storing a subset of the ranked objects of the plurality of received objects in response to the analysis.

One or more of the following features may be included. The plurality of similarity graphs may include an object-object similarity graph, a base station-base station similarity graph, and a user-user similarity graph. The ranking for each of the plurality of received objects may be based upon, at least in part, a demand at each of a plurality of base stations, a weighting factor for premium and non-premium demands, and a bandwidth associated with each object of the plurality of received objects. Storing a subset of the ranked objects of the plurality of received objects may further comprise cooperatively storing the subset of higher ranked objects across a plurality of base stations. The computer program product may include generating demand predictions across time slots for a plurality of base stations. The computer program product may include identifying which of the plurality of user devices and the plurality of received objects occur together. The computer program product may include generating an online update of the ranking for each of the plurality of received objects and the plurality of users. In some embodiments, the collaborative filtering may be based upon, at least in part, co-clustering.

In another implementation, a computing system includes a processor and memory configured to perform operations including determining a ranking for each of a plurality of received objects using a plurality of similarity graphs; extracting a common structure by collaborative filtering data associated with a plurality of user devices and the plurality of received objects; analyzing the common structure to infer usage patterns within a time slot; and storing a subset of the ranked objects of the plurality of received objects in response to the analysis.

One or more of the following features may be included. The plurality of similarity graphs may include an object-object similarity graph, a base station-base station similarity graph, and a user-user similarity graph. The ranking for each of the plurality of received objects may be based upon, at least in part, a demand at each of a plurality of base stations, a weighting factor for premium and non-premium demands, and a bandwidth associated with each object of the plurality of received objects. Storing a subset of the ranked objects of the plurality of received objects may further comprise cooperatively storing the subset of higher ranked objects across a plurality of base stations. The computing system may include generating demand predictions across time slots for a plurality of base stations. The computing system may include identifying which of the plurality of user devices and the plurality of received objects occur together. The computing system may include generating an online update of the ranking for each of the plurality of received objects and the plurality of users. In some embodiments, the collaborative filtering may be based upon, at least in part, co-clustering.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
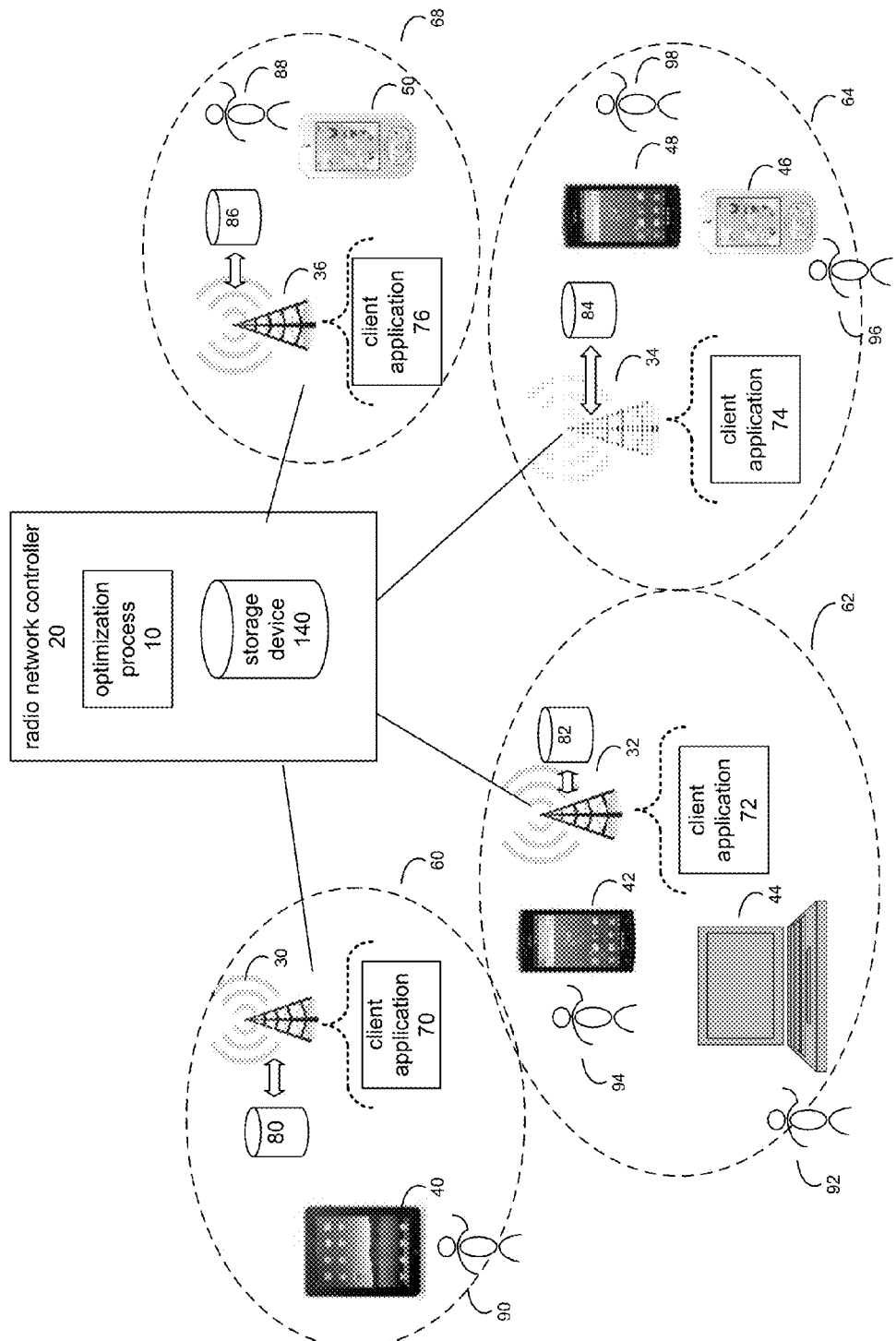
FIG. 1 is a diagrammatic view of an optimization process coupled to a mobile communication system.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The system described in this disclosure may impact end users and telecommunication service providers. A user may desire that a requested resource be delivered without much delay. In order to enhance user experience, the system may seek to provide a quick response time for requested resources through the efficient management of available resources, such as video files, audio files, SMS messages, and other types of data. The telecommunication service provider may want to maximize revenue by using targeted advertisements. The system may provide an efficient utilization of network bandwidth while minimizing network impact.

Referring to FIG. 1, there is shown optimization process 10 that may reside on and may be executed by radio network controller 20. The radio network controller 20 may be connected to one or more base stations 30, 32, 34, 36 which may service one or more geographical regions. Base stations 30, 32, 34, 36 may provide service within their respective service areas 60, 62, 64, 68. Base stations 30, 32, 34, 36 may provide service to multiple user equipment devices 40, 42, 46, 48, 50 if they are within the service areas 60, 62, 64, 68. Content providers and user equipment devices may be collectively known as nodes. Large amounts of data may be transferred between and among nodes over the cellular networks associated with the radio network controller 20.

Examples of radio network controller 20 may include but are not limited to a single server computer, a series of server computers, a single personal computer, a series of personal computers, a mini computer, a mainframe computer, or a computing cloud. The various components of radio network controller 20 may execute one or more operating systems, examples of which may include but are not limited to: Microsoft Windows Server™; Novell Netware™; Redhat Linux™, Unix, or a custom operating system, for example.

As will be discussed below in greater detail, optimization process 10 may determine a ranking for each of a plurality of received objects using a plurality of similarity graphs. Optimization process 10 may extracts a common structure by collaborative filtering data associated with a plurality of user equipment and the plurality of received objects. The common structure may be analyzed to infer usage patterns within a time slot. A subset of the ranked objects of the plurality of received objects may be stored in response to the analysis.

The instruction sets and subroutines of optimization process 10, which may be stored on storage device 140 of radio network controller 20, may be executed by one or more processors (not shown) and one or more memory architectures (not shown) included within radio network controller 20.

Optimization process 10 may be accessed via one or more client applications 70, 72, 74, 76 of base stations 30, 32, 34, 36. Examples of client applications may include but are not limited to a standard web browser, a customized web browser, or a custom application. The instruction sets and subroutines of client applications, which may be stored on storage devices 80, 82, 84, 86 coupled to client base stations 30, 32, 34, 36, respectively, may be executed by one or more processors (not shown) and one or more memory architectures (not shown) incorporated into base stations 30, 32, 34, 36.

Examples of user equipment devices 40, 42, 44, 46, 48, 50 may include, but are not limited to, personal computer 38, laptop computer 44, smart phone 46, 50, notebook computer (not shown), a server (not shown), a data-enabled, cellular telephone 42, 48, a dedicated network device (not shown), and a tablet computing device 40.

One or more client applications may be configured to effectuate some or all of the functionality of optimization process 10. Accordingly, optimization process 10 may be a purely server-side application, a purely client-side application, or a hybrid server-side/client-side application that is cooperatively executed by one or more client applications and optimization process 10.

Users 88, 89, 90, 92, 94, 96, 98 may access radio network controller 20 and optimization process 10 directly through a cellular network or through a secondary network. Further, radio network controller 20 may be connected to the cellular network through a secondary network.

The various user equipment devices may be directly or indirectly coupled to a cellular network connecting them to the radio network controller 20.

As is known in the art, Bluetooth is a telecommunications industry specification that allows e.g., mobile phones, computers, and smart phones to be interconnected using a short-range wireless connection.

User equipment devices 40, 42, 44, 46, 48, 50 may each execute an operating system, examples of which may include but are not limited to Apple iOS™, Microsoft Windows™, Android™, Redhat Linux™, or a custom operating systems.

As discussed above and referring to FIGS. 2-3, optimization process 10 may include a radio network controller 20 determining a ranking for each of a plurality of received objects using a plurality of similarity graphs. The radio network controller 20 may extract a common data structure by collaborative filtering data associated with a plurality of users and the plurality of received objects, described in more detail below. The common structure may be analyzed to infer usage patterns within a time slot. A subset of the ranked objects of the plurality of received objects is stored in response to the analysis.

Figure 2:
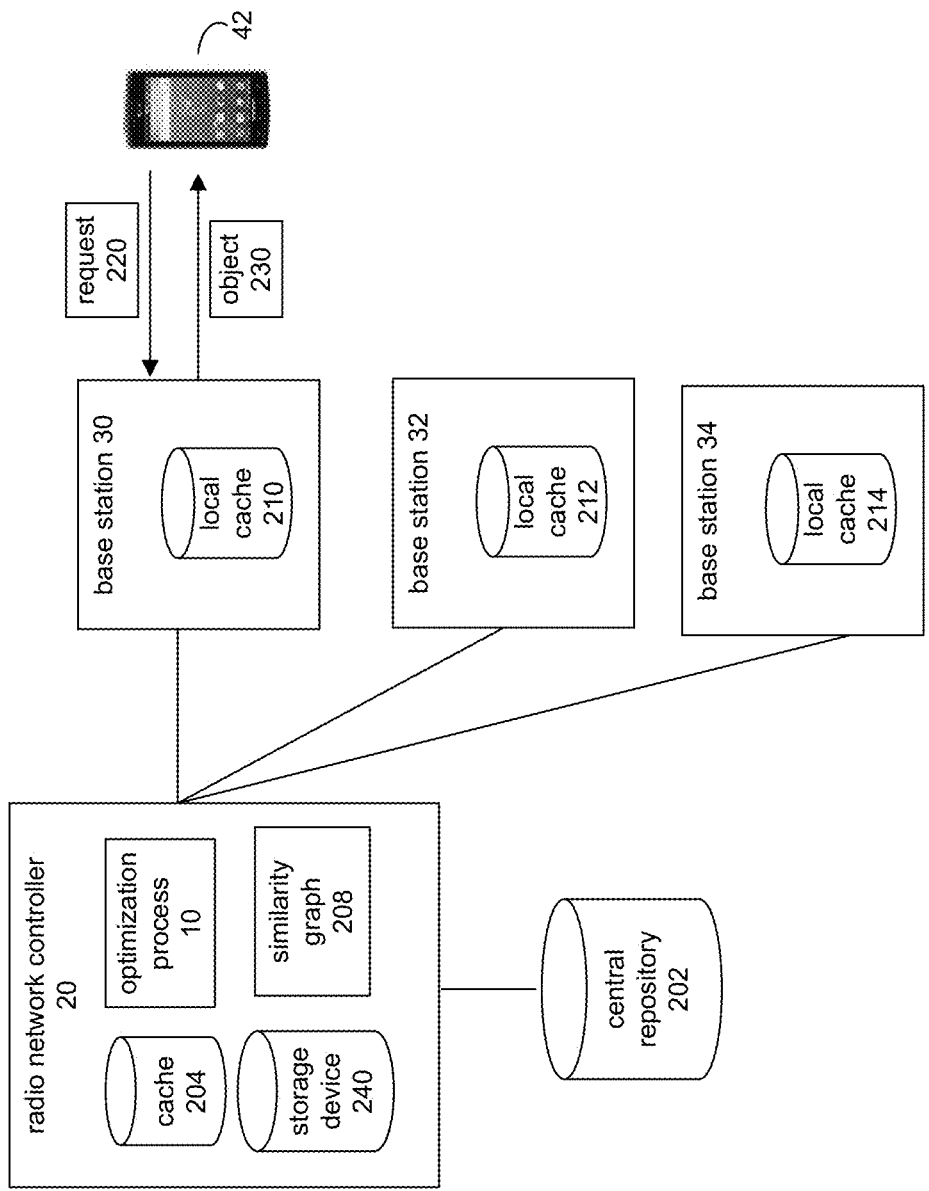
FIG. 2 is a diagrammatic view of an optimization process couple to a mobile communication system.
Figure 3:
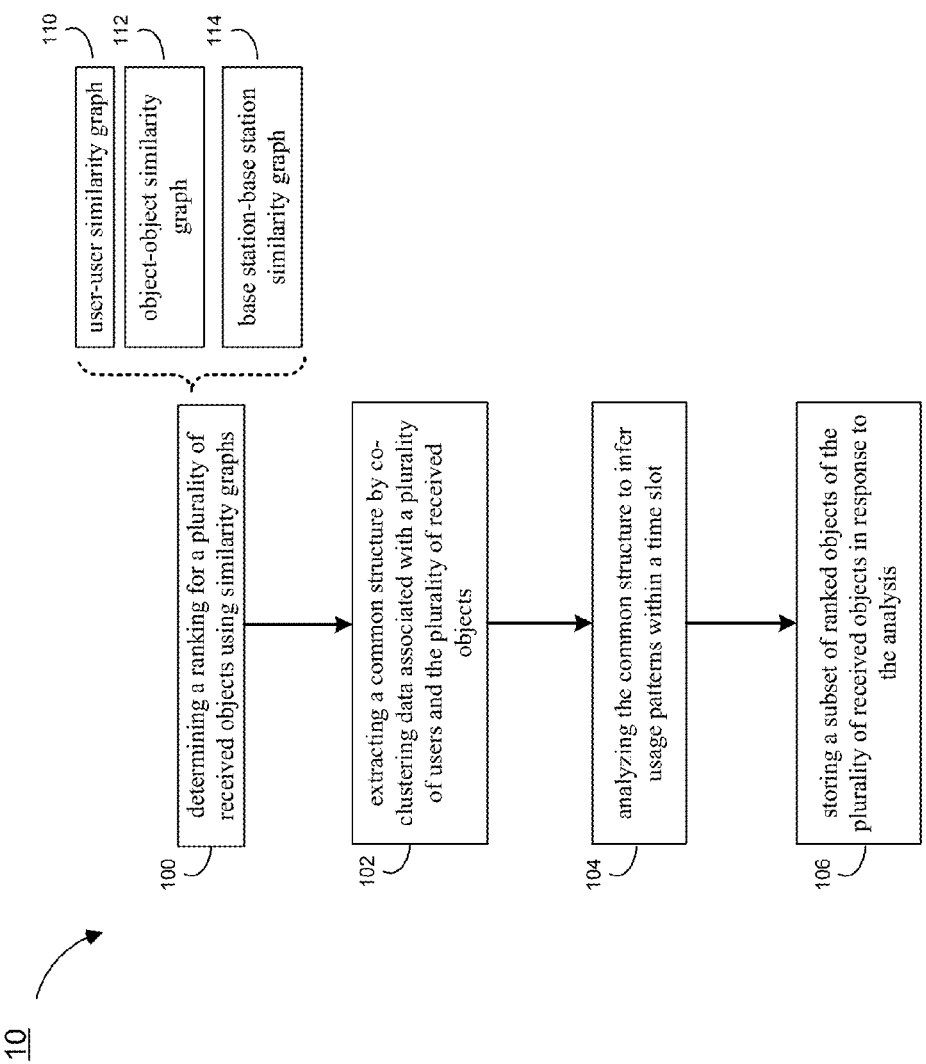
FIG. 3 is a flowchart of the optimization process of FIG. 1.

Referring now to FIG. 2, in more detail, radio network controller 20 may include cache 204 and execute optimization process 10. Radio network controller 20 may be in communication with central repository 202. Radio network controller 20 may be in communication with base stations 30, 32, 34. Base stations 30, 32, 34 may include local cache 210, 212, 214, respectively. In the example embodiment, base station 30 may be in communication over a cellular network with user equipment device 42. Although FIG. 2 only depicts user equipment device 42, base stations 30, 32; 34 may be in communication with multiple user equipment devices (e.g., tablet 40, cell phone 42, laptop 44, smart phone 46). Radio network controller 20 may include similarity graphs 208 that may be generated by radio network controller 20 or received from a different source. A similarity graph 208 may include nodes and edges to indicate objects and relationships. By comparing similarity graphs of users and user equipment, base stations, and requested objects, trends in behavior by the users may be inferred and/or identified. Similarity graphs 208 may be used to determine rankings of objects and to infer behavior trends of users, as described in further detail below. Behavior trends of users may be identified and/or inferred by comparing users and user device, requested objects (e.g., news article or music file), and base stations to identify, for instance, similar users who may access base stations at a particular time to request similar objects.

Base station 30 may use the local cache 210 to satisfy a request 220 for an object received from user equipment (e.g., cell phone 42). In some embodiments, the object may be any data structure or file requested by the user through the user equipment and then received by the user equipment, such as music files, news articles, or other similar types of information. If the requested resource or object is not available in local cache 210, the request 220 may be forwarded to the radio network controller 20, which may fetch the requested resource or object 230 from base station 32, cache 204, or a central repository 202.

Central repository 202 may include but is not limited to: a hard disk drive; a flash drive, a tape drive; an optical drive; a RAID array; a random access memory (RAM); and a read-only memory (ROM).

Optimization process 10 may determine 100 a ranking for each of the received objects using one or more similarity graphs 208. Optimization process 10 may generate one or more similarity graphs 208 based on existing or received data (e.g., historic data associated with the user, user equipment, base stations, and/or requested objects which may be stored in any one of the storage devices described herein).

Similarity graphs 208 may include an object-object similarity graph 110, a base station-base station similarity graph 114, and a user-user similarity graph 112. The object-object similarity graph 110 may represent requested objects from one or more base stations. A base station-base station similarity graph 114 may represent the one or more base stations and the type of information requested and users accessing the base stations. The user-user similarity graph 112 may represent users and user equipment and may indicate what type of information or objects the users request as well as which base-stations the users access. The similarity graphs 208 may be used to determine 100 a ranking for received objects. The similarity graphs 208 may be used to gain useful insights reflecting user behavior and provide optimization and identify opportunities. Insights may include, for example, identifying a type of user equipment that may consistently access a certain base station, regardless of the objects requested, or if a user accesses a certain base station at a certain time, then they are likely to request a certain object, regardless of the type of user equipment that may be involved. Opportunities may include areas for network optimization for pre-caching of objects and targeted advertisements based on user behavior.

In an example, optimization process 10 may generate an object-object similarity graph 112. Each node of the object-object similarity graph 112 may correspond to a request for an object or resource. An edge between any pair of nodes may represent the similarity between the represented objects. Similarity may be determined by using, for example, the dot product of the demand vectors of the two objects (where each component represents a demand for the object at base station). Similarity may be determined using the number of customers requesting the two objects during the same time slot. Optimization process 10 may generate and/or obtain a user-user similarity graph 110 and base station-base station similarity graph 114 using similar methods and techniques. Similarity graphs 208 may be stored by the radio network controller 20. In some embodiments, similarity graphs 208 may be stored on the radio network controller 20 or the central repository 202.

Optimization process 10 may determine 100 a ranking for each of the received objects which may be based upon, at least in part, a demand at each of the base stations, a weighting factor for premium and non-premium demands (e.g., classification of demands where the premium demands may take precedent over non-premium demands), and a bandwidth associated with each object of the plurality of received objects. In some embodiments, users may be designated as premium and non-premium (e.g., users may be designated premium and non-premium based on different criteria, such as account type with the telecommunication provider, type of device accessing the base, and other factors).

In one embodiment, the ranking of received objects may be calculated using the following mathematical formulation:

$$\min_{f \in \mathcal{R}^n} \frac{1}{2} f^T L f + M \sum_{i,j} \eta_{ij} \sum_l \left( \zeta \frac{D_{il}}{\sum_k D_{kl}} + \frac{D'_{il}}{\sum_k D'_{kl}} \right) W_i C_{il} - \left( \zeta \frac{D_{jl}}{\sum_k D_{kl}} + \frac{D'_{jl}}{\sum_k D'_{kl}} \right) W_j C_{jl}$$

subject to $$f_i - f_j \geq 1 - n_{ij}, \quad (1)$$

$$n_{ij} \geq 0 \, \forall i,j \quad (2)$$

where each object $I_i$ has a bandwidth $W_i$; $C_{il}$ units of cost is associated with unit transfer of item $I_i$ from the radio network controller (RNC) to base station $B_l$; there is a premium demand $D'_{il}$ and a non-premium demand $D_{il}$ for $I_i$ at base station $B_l$; $\zeta > 1$ represents the weight assigned to the premium demand; $n_{ij}$ represents the corresponding Lagrangian coefficient; L represents the Laplacian matrix of the graph; and M is the coefficient of the regulizer, which is introduced to avoid overfitting.

Optimization process 10 may extract 102 a common structure by collaborative filtering data associated with users and received objects. In some embodiments, collaborative filtering may be the process of filtering for information or patterns using techniques involving collaboration among multiple agents, viewpoints, data sources, or the like. In some embodiments, collaborative filtering may be a method of making automatic predictions about the interests of one or more users by collecting preferences or data associated with the users. In some embodiments, collaborative filtering may be based upon, at least in part, co-clustering. In some embodiments, co-clustering may be a data mining technique that allows simultaneous clustering of rows and columns of a matrix.

The data associated with the users and user devices may be collected by base stations 30, 32, 34, 36 and transmitted to radio network controller 20. In some embodiments, the data associated with the users and user devices may include type of user device, demographic information about the user, the duration of a user's connection, the type of connection used by the user device, and other similar information. The data associated with the received objects may be collected by base stations 30, 32, 34, 36 and transmitted to radio network controller 20. The data may include information regarding the source of the object, the type of object, how often the object is updated, and other similar information.

Optimization process 10 may choose a subset of the ranked objects and collaborative filter the ranked objects with the data associated with a subset of users. In some embodiments, the optimization process 10 may choose a subset of ranked objects based on criteria specified by an administrator or by criteria specified by the telecommunication provider. In some embodiments, optimization process 10 may use all the ranked objects and collaborative filter the ranked objects with the data associated with the users. Results of the collaborative filtering may be stored to a common data structure. Optimization process 10 may obtain and/or generate similarity graphs 208 corresponding to objects, base stations, and users for each time slot of a base station. In some embodiments, the telecommunication provider may identify time slots of particular increments of time (e.g., hour long slots that begin on the hour, so that there are 24 times in a day). In some embodiments, for graphs of the same type (e.g., objects), clustering may be performed using techniques, such as Link Matrix Factorization, to extract 102 and/or generate a common structure.

Optimization process 10 may analyze 104 the common data structure to infer usage patterns within a time slot of one or more base stations. Optimization process 10 may analyze 104 the common data structure by generating pair predictions of objects and users based upon, at least in part, the collaborative filtering. Predictions may be generated by optimization process 10 using the collaborative filters, such as users who may request similar objects. By utilizing collaborative filtering of objects and users, an integrated view of user behavior may be generated for different base stations, which may produce personalized segmentation for different time slots of the base stations. Optimization process 10 may identify which of the users and ranked objects occur together. By identifying and/or inferring customer behavior for a time slot of one or more base stations, optimization process 10 may facilitate personalized targeting of users. For example, telecommunication providers may use the identified and/or inferred customer behavior for a time slot of one or more base stations to create targeted incentive plans and facilitate opportunities by storing relevant or related objects in local cache of base station. Targeted incentive plans may include using data identified and/or inferred about customer behavior to identify opportunities tailored to specific individuals. For example, if a group of users accesses news websites in the morning between 8:00 AM and 9:00 AM, then the telecommunication provider may provide news providers the ability to advertise during that time to the group of identified users.

In some embodiments, identifying and/or inferring user behavior for a time slot of one or more base stations may contribute to building effective systems to identify and recommend objects to users. Collaborative filtering may also identify which base stations serve the same type of demands, and may aid in understanding what types of object should be introduced or focused upon in the future. For example, collaborative filtering may aid in the generation of a pre-fetch schedule for high priority objects based upon the analysis of user behavior identified by collaborative filtering. In some embodiments, optimization process 10 may generate demand predictions across time slots for one or more base stations. In some embodiments, optimization process 10 may generate an online update of the ranking for the received objects and the users, which may be based upon collaborative filtering.

In some embodiments, identifying and/or inferring user behavior for a time slot of one or more base stations may facilitate efficient spatio-temporal mining. Spatio-temporal data may include data related to space and time of users and objects. In some embodiments, the system may be used to mine data across time slots and find patterns that emerge therein. In some embodiments, the spatio-temporal mining analysis may be conducted or executed during off-peak hours, which may reduce any negative effects to the network resulting from the analysis. Spatio-temporal mining may provide the telecommunication provider with an insight into the behavior of users across time slots, which may provide a better opportunity for targeted segmentation. Examples of spatio-temporal data may include data received from a user equipment for a user which may be received from multiple base stations as a result of the user moving from one geographic location to another, (e.g., the user equipment communicating with base station 30 and then communicating with base station 32 as the user moves from service area 60 to service area 62. Spatio-temporal data mining by optimization process 10 may reveal further user behaviors that may be useful to telecommunication providers to provide additional services to users or further optimize the network.

Optimization process 10 may store 106 a subset of the ranked objects in response to the analysis of the common data structure. In some embodiments, optimization process 10 may store 106 the ranked objects in local cache 210 of base station 30. In some embodiments, optimization process 10 may store 106 the ranked objects in cache 204 of radio network controller 20. In some embodiments, optimization process 10 may store 106 the ranked objects in central repository 202 associated with radio network controller 20. In some embodiments, optimization process 10 may cooperatively store 106 the ranked objects in local cache 210 of base stations 30, 32, 34, and 36. In some embodiments, online rank aggregation at the edge results in improvement of the hit rate of the cache and/or may determine the top ranked items.

Optimization process 10 may store 106 the subset of ranked objects to improve the caching with regards to different object types, where keeping the most relevant data or highly ranked objects in cache may minimize response time and communication overhead in transmitting the requested object to the user which may enhance experience of the user.

In some embodiments, demand prediction for next time slots may be used to pre-fetch objects in the cache as well as evict objects from the cache. This may improve the hit-rate of the cache of the base stations.

In some embodiments, the edge-core combination may incorporate the positive aspects of both the edge and the core. The edge may offer real online and distributed processing. The core may leverage the large computational resources and storage to capture long term behavior.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:

determining, by a radio network controller, a ranking for each of a plurality of received objects using a plurality of similarity graphs for a plurality of base stations, wherein the plurality of received objects include data files received from at least one of the plurality of base stations, the ranking calculated by $$\min_{f \in \mathcal{R}^n} \frac{1}{2} f^T L f + M \sum_{i,j} n_{ij} \sum_{l} \left( \zeta \frac{D_{il}}{\sum_k D_{kl}} + \frac{D'_{il}}{\sum_k D'_{kl}} \right) W_i C_{il} - \left( \zeta \frac{D_{jl}}{\sum_k D_{kl}} + \frac{D'_{jl}}{\sum_k D'_{kl}} \right) W_j C_{jl}$$

subject to $$f_i - f_j \geq 1 - n_{ij}, \quad (1)$$

$$n_{ij} \geq 0 \, \forall i,j \quad (2)$$

where each object $I_i$ has a bandwidth $W_i$; $C_{il}$ units of cost is associated with unit transfer of item $I_i$ from the radio network controller to base station $B_j$; there is a premium demand $D'_{il}$ and a non-premium demand $D_{il}$ for $I_i$ at base station $B_j$; $\zeta>1$ represents a weight assigned to the premium demand; $n_{ij}$ represents a corresponding Lagrangian coefficient; L represents a Laplacian matrix of a graph; and M is a coefficient of a regulizer, which is introduced to avoid overfitting;

extracting, by the radio network controller, a common structure between a plurality of user devices and the plurality of received objects by collaborative filtering data associated with a plurality of user devices and the plurality of received objects;

analyzing, by the radio network controller, the common structure to infer usage patterns within a time slot;

generating, by the radio network controller, demand predictions for at least a subset of objects of the plurality of received objects across time slots for the plurality of base stations;

storing, by the radio network controller, the subset of the ranked objects of the plurality of received objects in response to the analysis and the demand predictions, including pre-fetching the subset of the ranked objects of the plurality of received objects into a local cache of a base station of the plurality of base stations based upon, at least in part, the demand predictions for the time slot of the base station to reduce response time to access the plurality of received objects; and evicting one or more pre-fetched ranked objects of the subset of ranked objects from the local cache of a base station of the plurality of base stations according to the demand predictions for the time slot of the base station.

2. The computer-implemented method of claim 1 wherein the plurality of similarity graphs include an object-object similarity graph, a base station-base station similarity graph, and a user-user similarity graph.

3. The computer-implemented method of claim 1 wherein the ranking for each of the plurality of received objects is based upon, at least in part, a demand at each of the plurality of base stations, a weighting factor for premium and non-premium demands, and a bandwidth associated with each object of the plurality of received objects.

4. The computer-implemented method of claim 1 wherein storing a subset of the ranked objects of the plurality of received objects further comprises cooperatively storing the subset of ranked objects across the plurality of base stations.

5. The computer-implemented method of claim 1 further comprising identifying which of the plurality of user devices and the plurality of received objects appear together in the plurality of similarity graphs.

6. The computer-implemented method of claim 1 further comprising generating an online update of the ranking for each of the plurality of received objects and the plurality of users.

7. The computer-implemented method of claim 1 wherein the collaborative filtering is based upon, at least in part, co-clustering.

* * * * *